United States Patent

[11] 3,613,076

[72] Inventor Richard P. Ballou
Howell, Mich.
[21] Appl. No. 745,868
[22] Filed July 18, 1968
[45] Patented Oct. 12, 1971
[73] Assignee General Motors Corporation
Detroit, Mich.

[54] VEHICLE SIGNALING SYSTEM INCLUDING MODE CHANGING DIRECTION SIGNAL
16 Claims, 5 Drawing Figs.
[52] U.S. Cl. .................................................. 340/67,
307/41, 315/210, 340/82
[51] Int. Cl. .................................................. B60q 1/38
[50] Field of Search ........................................... 340/67, 82

[56] References Cited
UNITED STATES PATENTS
| | | | |
|---|---|---|---|
| 3,315,227 | 4/1967 | DuRocher .................. | 340/82 |
| 3,500,312 | 3/1970 | Stankovich ................. | 340/67 |
| 3,500,315 | 3/1970 | Shimada .................... | 340/82 |
| 3,504,338 | 3/1970 | Breece ...................... | 340/67 |

*Primary Examiner*—John W. Caldwell
*Assistant Examiner*—Kenneth N. Leimer
*Attorneys*—Albert F. Duke, E. W. Christen and C. R. Meland ABSTRACT: A system for energizing left and right front signal lamps and three left and right rear signal lamps to indicate impending changes in vehicle direction and/or an emergency condition of the vehicle is disclosed. In a preferred embodiment of the invention a timer which includes a single time delay relay which is energizable by actuation of a direction signal switch in either direction signaling position is effective to time the sequential energization of the three rear signal lamps. The timer is also energizable by actuation of a stop signal switch to provide simultaneous and continuous energization of all the rear signal lamps and is further energizable by a hazard warning switch to provide simultaneous flashing of all the front and rear signal lamps. In each of the several embodiments disclosed the direction signal indication changes from a sequential mode to a simultaneous flashing mode upon actuation of the stop signal switch subsequent to actuation of the direction signal switch to indicate an impending deceleration of the vehicle preparatory to a change in direction of the vehicle.

INVENTOR
Richard P. Ballou
BY
Albert F. Duke
ATTORNEY

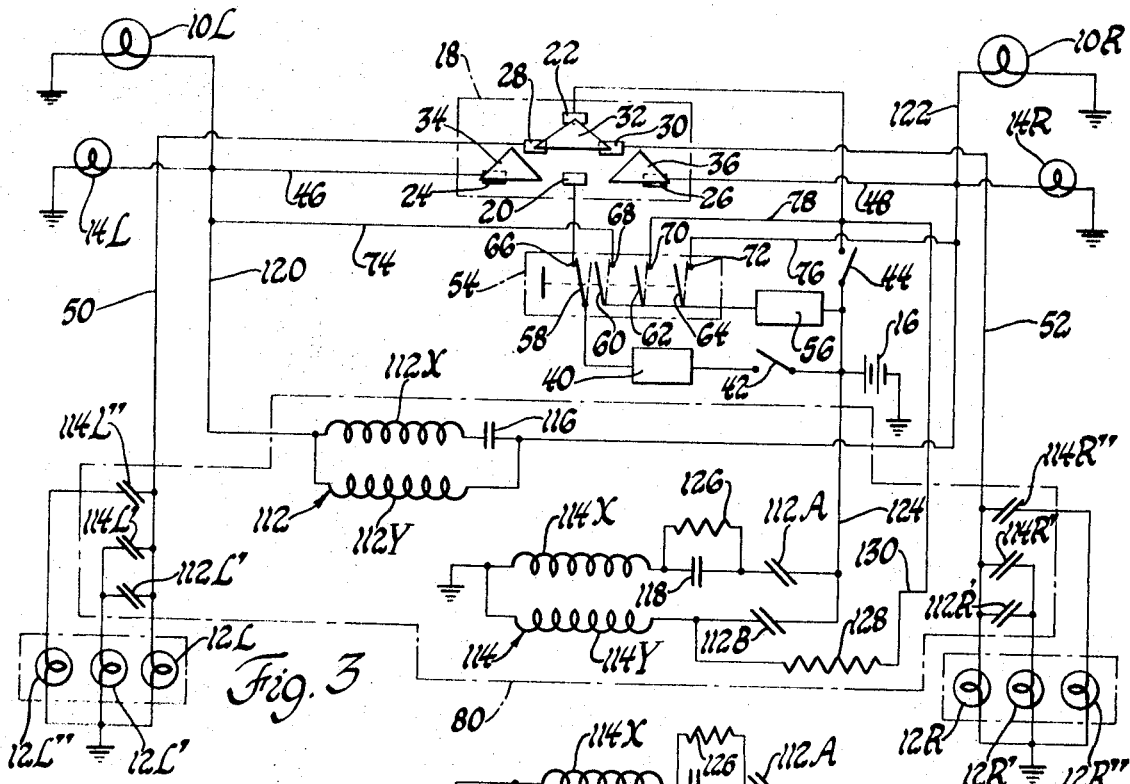
Fig. 3
Fig. 4
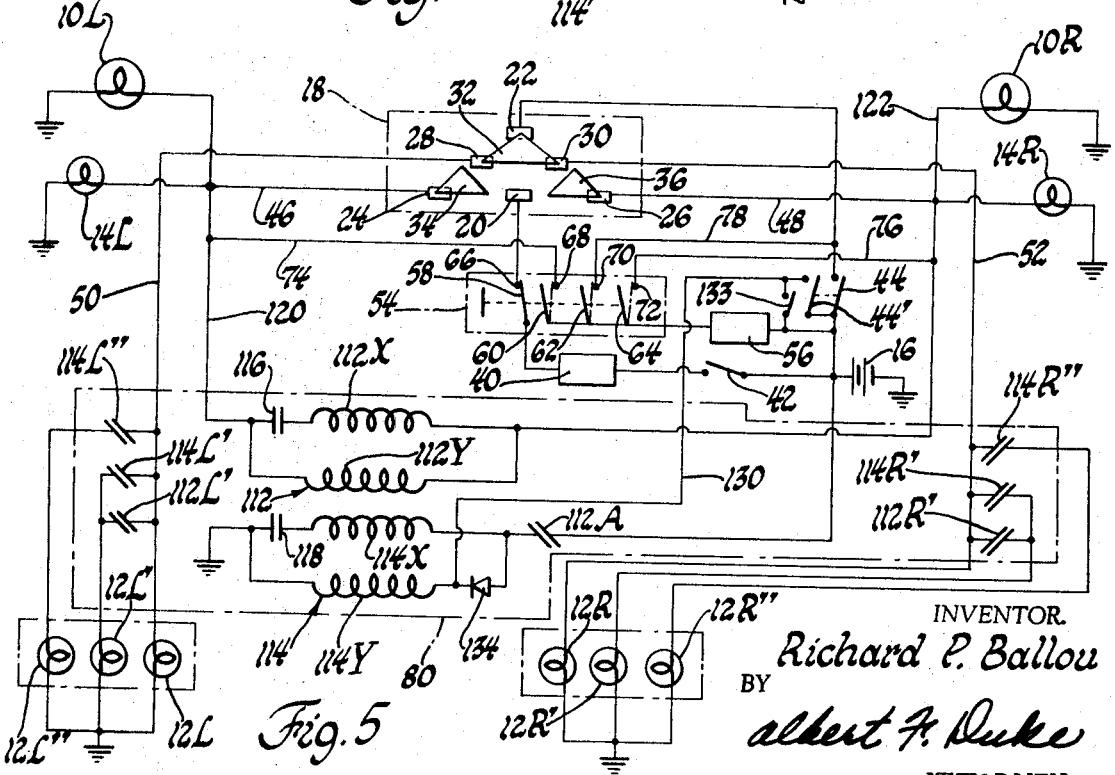
Fig. 5
INVENTOR.
Richard P. Ballou
BY
Albert F. Duke
ATTORNEY

VEHICLE SIGNALING SYSTEM INCLUDING MODE CHANGING DIRECTION SIGNAL

This invention relates in general to vehicle signaling systems and more particularly to a vehicle signaling system wherein a plurality of lamps are energized to indicate to other motorists impending changes in vehicle direction and/or speed or of vehicle condition.

Vehicle signaling systems presently in use include signal lamps mounted at the front and rear of the vehicle on the left- and right-hand sides thereof for indicating to others contemplated changes in direction or speed of the vehicle. In general, these systems include a manually operable three position direction signal switch and a flasher for selectively flashing the left front and rear or the right front and rear signal lamps. Such systems further include a stop signal switch connected with the direction signal switch to continuously energize both the rear signal lamps when the direction signal switch is in a neutral position or to continuously energize the rear lamp on the side opposite are intended turn when the direction signal switch is in an operating position. Presently, vehicles are also equipped with a hazard warning switch and a second flasher for simultaneously flashing all of the front and rear lamps.

It has been proposed to provide the vehicle with a plurality of left and right rear signal amps which are sequentially energizable to indicate the impending change in vehicle direction. Generally speaking, in the prior art systems, sequential energization of the rear lamps involves the utilization of a rotating contactor or a plurality of sequentially energizable time delay relays or other switching means for controlling the lamps. Since it is desirable to utilize the same lamps for signaling impending changes in both direction and speed while maintaining the conventional stop signal indication on both normal deceleration and deceleration in contemplation of a change of direction, such prior art systems have required separate timers for the left and right rear lamps; or where a single timer is used to control the rear lamps on both sides of the vehicle, switching components, in addition to the conventional direction signal switch, have been required in order to provide isolation between the left and right rear lamps. Moreover, the interconnection of the additional timing and switching components with the manual control switches in the driver compartment of the vehicle has required extensive wiring, all of which have increased the cost of such systems.

With the foregoing in mind, it is an object of the present invention to provide a system for sequentially energizing a plurality of lamps to indicate an impending change in vehicle direction and requiring a minimum of additional components which may be conveniently interconnected with the components of the present vehicle signaling systems with a minimum of additional wiring and without modification of the existing components.

It is another object of the present invention to provide a vehicle signaling system including simple and economical signal lamp timer means which are actuable by conventional direction signal, stop signal and hazard warning switches to provide a sequential direction signal indication while maintaining the present stop and hazard warning indication.

It is another object of the present invention to provide a vehicle signaling system wherein a plurality of signal lamps on one side of the vehicle are sequentially energized to indicate an impending change of vehicle direction and wherein the direction signal changes from a sequencing mode to a simultaneous flashing mode to indicate an impending deceleration of the vehicle preparatory to the change of direction.

It is another object of the present invention to provide a single timer which may be conveniently located at the rear of the vehicle and interconnected with the existing rear lamp energizing conductors and which is energizable in either position of the direction signal switch to control the sequential lighting of either the left or right rear lamps and which is responsive to operation of a stop signal or hazard warning switch for respectively continuously energizing or periodically flashing all of the rear lamps.

It is another object of the present invention to provide a timer for timing the sequential energization of three separate loads by employing the delay associated with both pull-in and dropout of a single time delay relay.

In accordance with a preferred embodiment of the present invention, a timer is connected to the rear lamp energizing circuits of a conventional vehicle signaling system which includes a left and right rear signal lamp so as to be energized simultaneously with energization of either the left or right signal lamps. The timer includes a single time delay relay which controls the energization of second and third left and right rear signal lamps whereby the three lamps on either the left or right side of the vehicle are energized in sequence depending upon the selected position of the direction signal switch. The deenergization of the lamps is accomplished simultaneously by operation of the conventional flasher. The timer also includes a switching relay which controls the energization and deenergization of the time delay relay. The switching relay, in addition to being energized through the flasher in response to pull-in of the time delay relay, is also energizable through a resistance network, irrespective of the condition of the time delay relay, by closure of the stop signal switch or hazard warning switch. The signal lamp operation thus effected is the simultaneous and continuous energization of all the rear lamps for signaling a stop or the simultaneous flashing of all the signal lamps signaling an emergency or hazardous condition. Furthermore, the response of the timer to actuation of the stop signal switch while the direction signal switch is in an operative position provides continuous energization of all the rear lamps on the side opposite the intended change in vehicle direction while the mode of operation of the signal lamps indicating the change of direction changes from a sequential to a simultaneous flashing of the lamps.

These and other objects and advantages of the present invention will become apparent from the following detailed description which should be read in conjunction with the drawings in which FIG. 1 is a schematic diagram of a preferred embodiment of the invention utilizing a timer including a single time delay relay.

FIGS. 3, 4 and 5 are schematic diagrams of other embodiments of the invention utilizing a timer including a pair of time delay relays.

Figure 1:
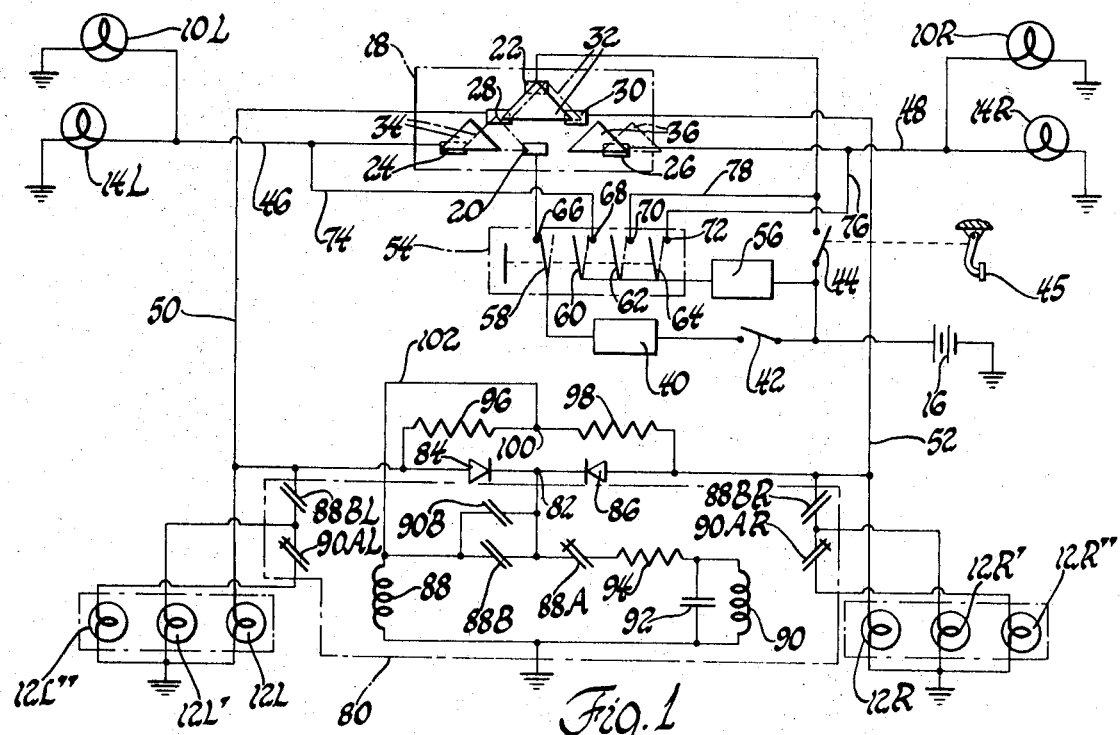

Referring now to the drawings and initially to FIG. 1, a preferred embodiment of the present invention is shown. The system includes left and right signal lamps 10L and 10R, respectively, mounted on the front of the vehicle and left and right signal lamps 12L nd 12R, respectively, mounted at the rear of the vehicle. In addition, pilot lamps 14L and 14R are mounted within the vehicle to monitor the operation of the left and right signal lamps respectively.

A source of electrical power for energizing the aforementioned lamps is generally designated 16 and may be the usual vehicle battery. A direction signal switch generally designated 18 is connected between the aforementioned lamps and the source 16 and includes stationary input contacts 20 and 22, stationary output contacts 24, 26, 28 and 30 and movable bridging contacts 32, 34 and 36. The bridging contacts 32, 34 and 36 are movable together from an illustrated neutral position to either left or right direction signaling positions by a manually actuable direction signal mechanism which automatically returns the bridging contacts to the neutral position in response to steering wheel rotation. Such a mechanism is not shown but is well known in the art. A detailed description of such mechanism may be found in the U.S. Pat. No. 2,800,541 to Brown et al. assigned to the assignee of the present invention.

With the direction signal switch 18 in the neutral position as shown, the output contacts 28 and 30 are connected to the input contact 22 through the bridging contact 32. When the direction signal switch 18 is shifted to the left direction signaling position, as shown in dotted lines, the output contacts 24 and 28 are connected to the input contact 20 by the bridging contact 34. The bridging contact 32 moves out of engagement with the output contact 28 but maintains the connection between the input contact 22 and output contact 30. When the direction signal switch is moved to the right direction signaling position, the output contacts 26 and 30 are connected to the input contact 20 by the bridging contact 36. The bridging contact 32 moves out of engagement with the output contact 30 but maintains the connection between the input contact 22 and output contact 28. The input contact 20 is connected to the battery 16 through a conventional flasher 40 and a vehicle ignition switch 42 while the input contact 22 is connected to the battery 16 through a normally open stop signal switch 44.

The lamps 10L and 14L are connected to the output contact 24 through a conductor 46 while the lamps 10R and 14R are connected to the output contact 26 through a conductor 48. The lamp 12L is connected to the output contact 24 through a conductor 50 while the lamp 12R is connected to the output contact 30 through a conductor 52.

A hazard warning switch generally designated 54 is connected to the battery 16 through a conventional flasher 56. The switch 54 includes movable contacts 58, 60, 62 and 64 and stationary contacts 66, 68, 70 and 72. The switch 54 is actuable to a lamp energizing position, shown in dotted lines, which opens the circuit between the flasher 40 and the direction signal switch 18 and connects the lamps 10L, 14L and 10R, 14R to the flasher 56 through the conductors 74 nd 76, respectively. The switch 54 also connects the input contact 22 to the flasher 56 through a conductor 78.

The flasher 40 is preferably a load sensitive thermally responsive type of flasher which is normally closed and upon application of a predetermined lamp load thereto will periodically open and close the circuit to the lamps. With such a flasher, burnout of one of the lamps will decrease the current flow through the flasher to a point insufficient to heat the thermally responsive element thereof. Thus, if any front or rear signal lamps should burn out, the pilot lamps 14L or 14R would be continuously energized indicating to the driver that one of the left or right signal lamps, respectively, has burned out. The flasher 56 is preferably nonsensitive to load so that it will continue to flash all operative lamps even though one or more of the signal lamps has burned out. The switch 44 is preferably actuated by applying pressure to the vehicle brake pedal designated by the numeral 45.

While the direction signal switch 18 and the hazard warning switch 54 are shown as separate switches electrically interconnected by wiring, these switches may be combined in a manner set forth in copending application Ser. No. 593,971, now U.S. Pat. No. 3,510,839, filed Nov. 14, 1966 in the names of Harold V. Elliott, Willard E. Graddy and Daniel W. Hyden and assigned to the assignee of the present invention.

The circuitry and components thus far described are conventional and no claim is made to such circuitry or components per se. In accordance with the present invention, additional left rear signal lamps 12L', 12L" and additional right rear signal lamps 12R', 12R" are provided and are energizable under the control of a timer generally designated 80 which is connected at a junction 82 to both rear lamp energizing conductors 50 and 52 through semiconductor diodes 84 and 86, respectively.

The timer 80 comprises a pair of three pole relays 88 and 90. The relay 88 controls the energization and deenergization of the relay 90 through normally closed contacts 88A connected in series between the junction 82 and the relay 90. The relay 90 is connected across a capacitor 92 which is connected to the junction 82 through a resistor 94. The relay 90 controls the energization of the relay 88 through normally open contacts 90B. The relay 88 also controls normally open contacts 88B which provide a hold-in circuit for the relay 88. The relay 88 further controls normally open contacts 88BL and 88BR connecting the lamps 12L' and 12R' to the conductors 50 and 52, respectively, while the relay 90 controls normally closed contacts 90AL and 90AR connecting the lamps 12L" and 12R" to the conductors 50 and 52, respectively, through the normally open contacts 88BL and 88BR, respectively.

A resistance network shown as comprising a pair of resistors 96 and 98 is connected across the diodes 84 and 86 with the junction 100 between the resistors 96 and 98 being connected to the relay 88 through a conductor 102.

OPERATION OF FIG. 1 SYSTEM

Direction Signaling

If the direction signal switch 18 is moved to a left direction signaling position, as shown in dotted lines, and the ignition switch 42 is closed, the lamps 10L, 14L and 12L are instantaneously energized from the battery 16 through the flasher 40. At the same time the timer 80 is connected to the battery 16 through the conductor 50 and diode 84. The resistors 96 and 98 are connected in series between the conductors 50 and 52 and form a voltage divider so that the voltage at the junction 100 is approximately one-half battery voltage and is not sufficient to activate the relay 88. The values of the resistors 96 and 98 are chosen so that current flow from the conductor 50 to the lamps 12R, 12R' and 12R" is insufficient to energize these lamps. The diode 86 prevents current flow to the rear lamps 12R, 12R' and 12R" from the junction 82. The capacitor 92 is thus charged through the normally closed contacts 88A and the resistor 94. When the capacitor 92 is charged to battery voltage, the relay 90 will be energized. Energization of the relay 90 closes the normally open contacts 90B and opens the normally closed contacts 90AL and 90AR. Closure of the contacts 90B connects the relay 88 to the junction 82 and the relay 88 is energized without appreciable delay closing the contacts 88B, 88BL and 88BR and opening the contacts 88A. Closure of the contacts 88B provides a hold-in circuit for the relay 88 while closure of the contacts 88BL and 88BR connects the lamps 12L' and 12R' to the conductors 50 and 52, respectively; thus, a fixed time interval after energization of the lamp 12L, the lamp 12L' is energized. Opening the contacts 88A disconnects the capacitor 92 from the junction 82 and the capacitor 92 discharges through the relay 90 and after an interval of time the relay 90 drops out returning the contacts 90B to their normally open condition and returning the contacts 90AL and 90AR to their normally closed position. When this occurs, the lamps 12L" and 12R" are connected to the conductors 50 and 52, respectively, through the contacts 90AL, 88BL and 90AR, 88BR, respectively. Thus, a fixed time interval after energization of the lamp 12L', the lamp 12L" is energized. When the three rear lamps 12L, 12L' and 12L" have been connected to the flasher 40, sufficient current is drawn to heat the thermal element of the flasher 40 and after a fixed interval of time the flasher 40 opens. When the flasher 40 opens, the lamps 10L, 14L and 12L, 12L', 12L" are disconnected from the battery 16 and these lamps are immediately extinguished. Likewise battery voltage is removed from the junction 82 so that the relay 88 is deenergized. When the flasher 40 recloses, the cycle is repeated.

Mode Changing

If, while the switch 18 is in the left direction signaling position, the stop signal switch 44 is closed, the conductor 52 will be connected directly to the battery 16. The battery 16 is also connected to the conductor 50 through the flasher 40. With the battery 16 being connected to both conductors 50 and 52, the resistors 96 and 98 are connected in parallel with the parallel combination of the resistors 96 and 98 being connected in series with the relay 88 through the conductor 102. With the resistors 96 and 98 in parallel, the voltage across the relay 88 is significantly greater than when the resistors 96 and 98 form a voltage divider and consequently the relay 88 is energized. Energization of the relay 88 prevents energization of the relay 90 by opening the contact 88A. The contacts 88BL and 88BR are closed by energization of the relay 88 and since the contacts 90AL and 90AR remain in the normally closed position, the lamps 12L, 12L′ and 12L″ are simultaneously connected to the flasher 40 and thus will be simultaneously flashed. The lamps 12R, 12R′ and 12R″, being connected to the battery 16 through the conductor 52 and contacts 22, 30 and 32 of the direction signal switch 18 and the now closed stop signal switch 44, are continuously energized. Thus, the sequential energization of the lamps on one side of the vehicle will indicate to following drivers an impending change of vehicle direction with little or no deceleration such as for example, in making a lane change on an expressway. However, when the brakes are applied, the direction indication changes to a simultaneous flashing mode which, coupled with the constant energization of the lamps on the side opposite the turn, indicates to following drivers an impending deceleration of the vehicle preparatory to making the change in vehicle direction.

It will be apparent that placing the direction signal switch 18 in the right direction signaling position will cause the right and left signal lamps to be energized in the manner above described in connection with the left and right signal lamps respectively.

Stop Signaling

When the stop signal switch 44 is closed with the direction signal switch 18 in the neutral position as shown, the battery 16 is connected to both conductors 50 and 52, respectively, and in series with the relay 88 through the parallel combination of the resistors 96 and 98. Energization of the relay 88 opens the contacts 88A disconnecting the relay 90 from the junction 82 while closing the contacts 88BL and 88BR so that all of the lamps 12L, 12L′, 12L″ and 12R, 12R′, 12R″ are connected across the battery 16 through the conductors 50 and 52, respectively, and the contacts 22, 28, 30 and 32 of the direction signal switch 18 and the stop signal switch 44 and will thus remain continuously energized until the stop signal switch 44 is opened. Thus, the continuous energization of all the rear lamps will indicate to following drivers an impending deceleration of the vehicle with no change of vehicle direction contemplated.

Hazard Warning

Closure of the hazard warning switch 54 to the dotted line position connects the battery 16 to the lamps 10L and 10R through the flasher 56 and the conductors 74 and 76, respectively. The relay 88 is also connected to the battery 16 through the conductor 102, the parallel connected resistors 96, 98, the conductors 50, 52, the contacts 22, 28, 30, 32 of the direction signal switch 18, the conductor 78 and the flasher 56. Energization of the relay 88 connects all the rear lamps 12L, 12L′, 12L″ and 12R, 12R′, 12R″ to the flasher 56 so that all the front and rear lamps are flashed simultaneously.

Figure 2:
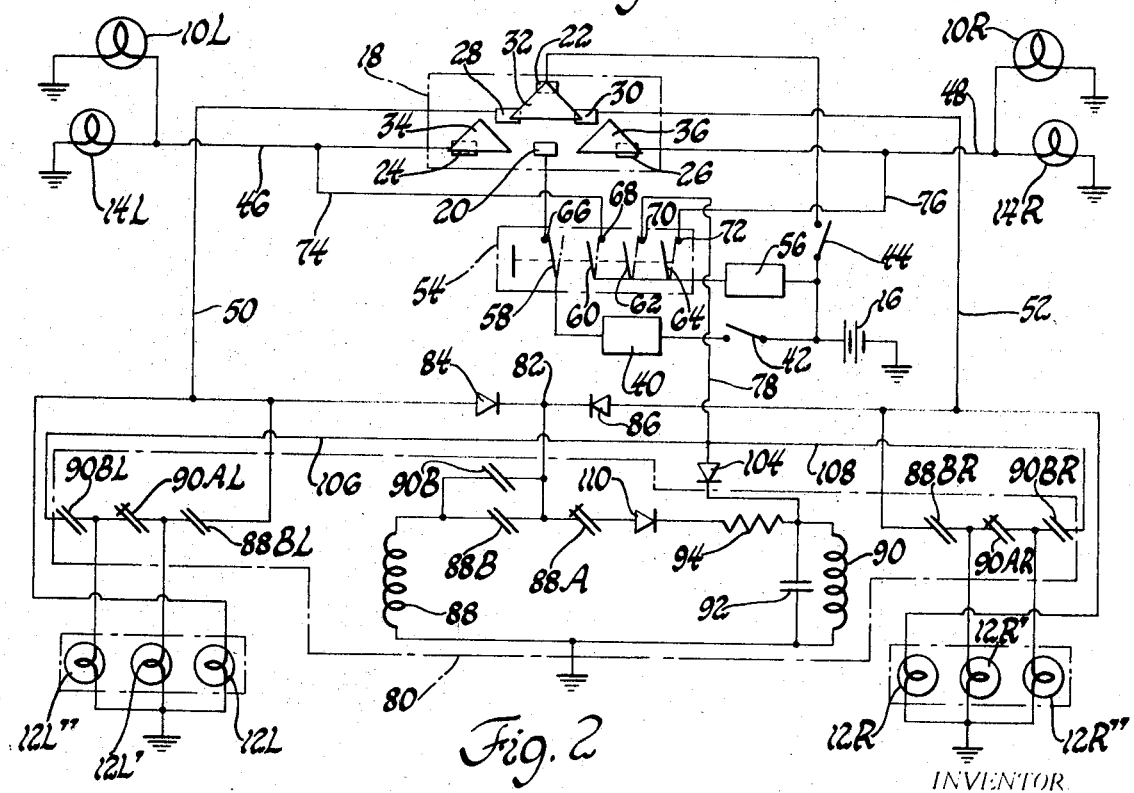
FIG. 2 is a schematic diagram of a modification of the FIG. 1 system producing a modified stop and hazard warning indication.

In FIG. 2 a modified form of the invention has been shown. In order to avoid needless repetition of the description, identical reference numerals have been applied to those parts corresponding to the parts of FIG. 1.

In FIG. 2 the conductor 78, leading from the contact 70 of the hazard warning switch 54, has been disconnected from the input contact 22 of the direction signal switch 18 and is, in the embodiment, connected to the relay 90 through a diode 104. Additional normally open contacts 90BL and 90BR connect the lamps 12L″ and 12R″ to the conductor 78 through conductors 106 and 108, respectively. The contacts 90BL and 90BR are preferably actuated by the same pole of the relay 90 which controls the normally closed contacts 90AL and 90AR, respectively. A diode 110 is connected between the resistor 94 and the normally closed contacts 88A for a purpose which will be described hereinafter.

OPERATION OF FIG. 2 SYSTEM

Direction Signaling

Movement of the direction signal switch 18 to either the left or right turn signaling positions will respectively energize the timer 80 in the manner previously described in connection with FIG. 1 to sequentially energize the left rear signal lamps 12L, 12L′, 12L″ or the right rear signal lamps 12R, 12R′, 12R″, respectively.

Mode Changing

If, while the direction signal switch 18 is in the left direction signaling position and the stop signal switch 44 is closed, the operation of the signal lamps 12L, 12L′, and 12L″ changes from a sequencing mode to a simultaneous flashing mode at the end of one cycle, i.e., when the relay 90 drops out. This results from the fact that when the stop signal switch 44 is closed, battery potential is continuously applied to the junction 82 through the diode 86 and the conductor 52. The relay 88 therefore remains continuously energized as long as the stop signal switch 44 is closed. The lamps 12L, 12L′ and 12L″ will thus be simultaneously flashed as a result of their connection to the flasher 40 through the conductor 50 and the contacts 20, 24, 28 and 34 of the direction signal switch 18. The lamps 12R, 12R′ and 12R″ are connected across the battery 16 through the stop signal switch 44, the contacts 22, 30, 32 of the direction signal switch 18 and the conductor 52 and are thus continuously energized.

Stop Signaling

When the stop signal switch 44 is closed with the direction signal switch 18 in the neutral position as shown, battery voltage is continuously applied through the conductors 50 and 52 to the junction 82 so that after an initial sequencing of the left signal lamps 12L, 12L′ and 12L″ and right signaling lamps 12R, 12R′, 12R″ all of these lamps remain continuously energized until opening of the stop signal switch 44.

Hazard Warning

Movement of the hazard warning switch 54 to the dotted line position will connect the capacitor 92 across the battery 16 through the conductor 78 and the diode 104. The relay 90 is thus instantaneously energized to open the contacts 90AL, 90AR and close the contacts 90BL, 90BR connecting only the lamps 12L″ and 12R″ to the flasher 56 through the conductors 106 and 108, respectively, and the conductor 78. The front lamps 10L and 10R are also connected to the flasher 56 through the conductors 74 and 76, respectively. Thus, the lamps 10L, 10R, 12L″ and 12R″ are flashed in synchronism to indicate an emergency or hazardous condition of the vehicle.

The form of the invention shown in FIGS. 3, 4 and 5 is likewise sufficiently similar to the form of the invention shown in FIG. 1 that identical reference numerals have been used to designate corresponding parts in order to avoid needless repetition of description.

In FIG. 3 the timer 80 includes a pair of four pole single throw relays 112 and 114. The relays 112 and 114 include windings 112X, 112Y and 114X, 114Y, respectively, which may either be separate windings or a single winding with a center tap. In either case the two windings are wound such that current flow through one winding of each pair produces flux in a direction opposite of that produced by current flow in the other winding of each pair. Capacitors 116 and 118 are connected in series with the windings 112X and 114X, respectively, to provide a time delay. The relay 112 is connected to the output terminals 24 and 26 of the direction signal switch 18 through conductors 120 and 122. The relay 112 will thus be connected to the battery 16 through the flasher 40 and the lamps 10R, 14R or the lamps 10L, 14L depending on the position of switch 18. Since opposite sides of the capacitor 116 are connected to the positive terminal of the battery 16 in the two direction signaling positions of the switch 18, the capacitor 116 should be either a nonpolarized capacitor or alternatively two relatively inexpensive electrolytic capacitors connected back to back. The relay 112 controls normally open contacts 112A and 112B connecting the windings 114X and 114Y of the relay 114 to the battery 16 through a conductor 124. Since only one side of the capacitor 118 will be connected to the positive terminal of the battery 16, the capacitor 118 may be a single electrolytic capacitor. The capacitor 118 has an internal shunt resistance indicated by the reference numeral 126 to provide a discharge path for the capacitor 118. Alternatively, the resistor 126 may be a separate resistor element. The relay 112 also controls normally open contacts 112L' and 112R' connecting the lamps 12L' and 12R' to the conductors 50 and 52, respectively. The relay 114 controls normally open contacts 114L', 114L" and 114R', 114R" connecting both of the lamps 12L', 12L" and 12R', 12R" to the conductors 50 and 52, respectively. The relay winding 114Y of the relay 114, in addition to being connected to the battery 16 through the normally open contact 112B, is also connected to the battery 16 through a current limiting resistor 128, a conductor 130 and the stop signal switch 44. Since the stop signal switch 44 is normally isolated from the capacitor 118, closure of the stop signal switch 44 will cause the relay 90 to pull in without appreciable delay.

OPERATION OF FIG. 3 SYSTEM

Direction Signaling

If the direction signal switch 18 is moved to a left direction signaling position with the stop signal switch 44 open and the ignition switch 42 closed, the lamps 10L, 12L and 14L are connected to the flasher 40 through the conductors 46 and 50. These lamps will thus be immediately energized. Simultaneously, the relay 112 is connected to the battery 16 through the flasher 40 and the lamps 10R and 14R. Current flow to the lamps 10R and 14R is insufficient to energize these lamps. Initially the capacitor 116 is discharged so that equal current flows in the windings 112X and 112Y. Little or no net magnetomotive force is developed and consequently the relay 112 does not pull in. As the capacitor 112 charges, the current flow through the winding 112X decreases and the net magnetomotive force increases. After a fixed delay determined by the charging rate of the capacitor 116, the relay 112 pulls in. The relay 112 closes the contacts 112L' which energizes the lamp 12L' through the flasher 40. The relay 112 also closes contacts 112A, 112B which connect the relay 114 to the battery 16. After another fixed interval of time, determined by the charging rate of the capacitor 118, the relay 114 closes the contacts 114L' and 114L" which energizes the lamp 12L" through the flasher 40. Although the energization of the relays 112 and 114 also closes contacts 112R', 114R' and 114R", the lamps 12R, 12R' and 12R" are not energized since the connection to the battery 16 through the flasher 40 is broken at the switch 18. While the lamps 12R, 12R' and 12R" are connected to the source 16 through the contacts 112B, the resistor 128, the conductor 130, the contacts 22, 28, 30, 32 of the switch 18 and the conductor 52, the value of the resistor 128 is sufficient to limit the current flow through the conductor 52 to a value which will not cause the rear lamps 12R, 12R' and 12R" to be energized. After all the lamps 12L, 12L' and 12L" have been connected to the flasher 40, current flow through the thermal element thereof will, after a fixed interval of time, cause the flasher to open simultaneously deenergizing the lamps 12L, 12L' and 12L". When the flasher opens, the relay 112 is disconnected from the battery 16 and the capacitor 116 discharges through the windings 112Y, 112X deenergizing the relay 112 and opening the contacts 112A, 112B, 112L' and 112R'. The capacitor 118 now discharges through the resistor 126 and the relay 114 drops out opening the contacts 114L', 114L", 114R', 114R". When the flasher 40 recloses, the lamps 112L, 112L' and 12L" are again sequentially energized and simultaneously deenergized.

Mode Changing

If, while the switch 18 is in the left direction signaling position, the brake pedal switch 44 is closed, the relay winding 114Y is immediately connected across the battery 16 through the conductor 130 and the resistor 128. The relay 114 is thus energized without any appreciable delay, closing the contacts 114L', 114L" and 114R'114R" and energizing the lamps 12L, 12L' and 12L" through the flasher 40, the conductor 50, and the contacts 20, 24, 28 and 30 of switch 18. Accordingly, all three lamps 12L, 12L' and 12L" are simultaneously flashed as long as the stop signal switch 44 is closed. The lamps 12R, 12R' and 12R" are connected directly across the battery 16 through the conductor 52, the contacts 22, 30, 32 of the switch 18 and the stop signal switch 44. Thus, the lamps 12R, 12R' and 12R" are continuously energized as long as the stop signal switch 44 is closed. Consequently, application of the brakes subsequent to actuation of the direction signal switch 18 will cause the lamps on the side indicating a change in direction to change from a sequential mode to a simultaneous flashing mode, while the lamps on the side opposite the intended change of direction will be continuously energized.

When the direction signal switch 18 is moved to the right direction signaling position, the operation of the timer 80 is identical with that previously described. However, in this position the lamps 12R, 12R' and 12R" are connected to the flasher 40 while the lamps 12L, 12L' and 12L" are disconnected from the flasher 40 but remain connected to the battery 16 through the stop signal switch 44.

It will be noted that with the direction signal switch 18 in either direction signaling position, the relay 112 continues to operate even when the stop signal switch 44 is closed. Therefore, the winding 114X is periodically connected to the battery 16 by closure of the contacts 112A. The reduction in ampere turns resulting from the inrush of current to the winding 114X when the contacts 112A close is not, however, sufficient to release the relay 114. This is because of the inherent inertia of the relay 114 and the smaller ampere turn requirement for hold-in relative to pickup. In this particular application, the capacitor 118 is charged so quickly so that the net ampere turns either do not drop below the hold-in value of the relay 114 or do so for an insufficient time to overcome the inherent inertia of the relay 118.

Stop Signaling

With the direction signal switch 18 in the neutral position as shown, closure of the stop signal switch 44 will connect the winding 114Y across the battery 16 through the conductor 130 and resistor 128. Energization of the relay 114 will cause the lamps 12L, 12L', 12L" and 12R, 12R', 12R" to be simultaneously and continuously connected across the battery 16 through the conductors 50 and 52, respectively, and the contacts 22, 28, 40 and 32 of the switch 18. Under these conditions the relay 112 is not energized.

Hazard Warning

When the hazard warning switch 54 is moved to a closed position as shown in dotted lines, the lamps 10L, 14L and 10R, 14R are energized from the battery 16 through the flasher 56 and the conductors 74 and 76, respectively. The positive terminal of the battery 16 is now connected to both sides of the relay 112 through the flasher 56 and the conductors 74, 120 and 76, 122, respectively, so that the relay 112 does not operate. At the same time winding 114Y of the relay 114 is energized through the flasher 56, the conductors 78 and 130 which closes the contacts 114L', 114L", 114R' and 114R", thereby connecting the lamps 12L', 12L". 12R' and 12R" in parallel with the lamps 12L and 12R, respectively, and to the flasher 56 through the conductors 50, 52 and the contacts 22, 28, 30 and 32 of the direction signal switch 18. Thus, all the front and rear lamps are simultaneously flashed under the control of the flasher 56.

FIG. 4 is partial schematic diagram of a modification of the circuit shown in FIG. 3 wherein the contacts 112A and 112B are connected in series. The resistor 128 of FIG. 3 has been replaced by a diode 132. The remainder of the circuit is identical with that shown in FIG. 3. The operation of both circuits is the same and in the interest of brevity will not be reiterated.

Referring now to FIG. 5, a diode 134 replaces the contacts 112B shown in FIGS. 3 and 4 and is connected in series with the contacts 112A in the manner shown in FIG. 4 and also eliminates the necessity of the resistor 126 of FIg. 3 since it provides a discharge path for the capacitor 118. The resistor 128 of FIG. 3 is also eliminated by the provision of a two pole stop signal switch 44, 44", thus isolating the energizing circuit of the relay 114 from the rear signal lamps as previously mentioned in connection with the resistor 128. The conductor 130 which connects the winding 114Y to the battery through the stop signal switch 44, 44' is, in the FIG. 5 embodiment, disconnected from the input terminal 22 of the direction signal switch 18 by the pole 44' of the stop signal switch 44, 44'. The direction signaling, mode changing and stop signaling operations are identical with those previously described in connection with FIG. 3 and in the interest of brevity will not be reiterated.

With regards to hazard warning operation, it will be noted that the conductor 130, in this embodiment, is disconnected from the hazard warning switch 54. Consequently, the relay 114 is not energized upon closure of the hazard warning switch 54. ACcordingly, only the rear lamps 12L and 12R, in addition to the front lamps 10L and 10R, are flashed upon actuation of the hazard warning switch 54. A normally open bypass switch 133 is connected between the battery 16 and the conductor 130 to permit the operator to energize the winding 114Y in conjunction with closure of the hazard warning switch 54 if it is desired to flash all the rear lamps.

It will be appreciated from the foregoing description that the control of the plurality of rear lamps to provide visual signaling of impending changes in vehicle direction, speed or condition of the vehicle has been accomplished with a minimum of additional components and wiring while providing a unique change in the mode of operation of the direction signaling lamps which informs following drivers of an impending deceleration of vehicle preparatory to initiating the change of direction.

While the invention has been shown and described by way of specific examples which are considered to be the most practical and preferred embodiments of the invention, it is recognized that departures may be made therefrom within the scope of the invention which is therefore not to be limited to the details disclosed herein. For a definition of the invention, reference should be had to the appended claims.

I claim:

1. A circuit for sequentially energizing a plurality of loads including a final load and at least one preceding load, said circuit comprising a source of voltage, a plurality of relay means including a final relay means and a double acting time delay relay means, said final relay means including normally open and normally closed contact means, said time delay relay means including normally open and normally closed contact means, means including said normally closed contact means of said final relay means connecting said time delay relay means to said source, said normally closed contact means of said time delay relay means connecting said final load across said preceding load, said normally open contact means of said time delay relay means connecting said final relay means to said source, said normally open contact means of said final relay means connecting said preceding load to said source and providing a holdin circuit for said final relay means upon energization thereof, whereby said final relay means and said preceding load are energized a predetermined interval of time after energization of said time delay relay means and said final load is energized a predetermined interval of time after deenergization of said time delay relay means.

2. A circuit for sequentially energizing first, second and third loads, said circuit comprising a source of voltage, switching relay means and time delay relay means, switch means including periodic interrupter means connecting said source to said first load, said switching relay means including normally closed contact means connecting said time delay relay means in parallel with said first load, said switching relay means including normally open contact means connecting said second load in parallel with said first load, said time delay relay means including normally closed contact means connecting said third load in series with the normally open contact means of said switching relay means and normally open contact means connecting said switching relay means in parallel with said first load, said switching relay means including hold-in contact means connected in parallel with the normally open contact means of said time delay relay means, whereby said first, second and third loads are energized in sequence and the time delay be between energization of said first and second loads and said second and third loads are controlled by said time delay relay means.

3. A vehicle signaling system comprising a source of voltage, flasher means connected in series with said source for periodically interrupting said source, normally open stop signal switch means connected in series with said source, first, second and third left and right rear signal lamps, direction signal switch means selectively operable from a neutral position to left or right direction signaling positions and including first and second input and output terminals, said first and second input terminals being connected respectively to said flasher means and said stop signal switch means, said direction signal switch means further including movable contact means connecting said second input terminal to both of said first and second output terminals when said direction signal switch means is in said neutral position and selectively connecting either of said output terminals to said first input terminal and the other of said output terminals to said second input terminal when said direction signal switch means is in said direction signaling positions, means connecting said first left and right rear signal lamps to said first and second output terminals respectively, first and second oppositely poled diodes connected across said first and second output terminals, timing circuit means connected to the junction between said first and second diodes whereby said timing circuit means is connected to said flasher means when said direction signal switch means is in either of said direction signaling positions and is connected to said stop signal switch means in all positions of said direction signal switch means said timing circuit means comprising first and second relay means, said first relay means including normally open contact means connecting said second left and right signal lamps in parallel with said first left and right signal lamps respectively, said first relay means including additional normally open contact means connecting said first relay means to said junction, said first relay means further including normally closed contact means connecting said second relay means to said junction, said second relay means including time delay means for delaying the actuation and deactuation thereof, said second relay means including normally open contact means connecting said first relay means to said junction and normally closed contact means connecting said third left and right signal lamps in series with the first said normally open contact means of said first relay means and in parallel with said second left and right signal lamps respectively whereby said left and right rear signal lamps are selectively energizable in sequence to indicate an impending change of direction of said vehicle and the indication changes from a sequential mode to a simultaneous flashing mode in response to actuation of said stop signal switch means.

4. The system defined in claim 3 further comprising left and right front signal lamps, additional flasher means, hazard warning switch means connected to said source through said additional flasher means and including contact means adapted when actuated to connect said additional flasher means to both of said front signal lamps, a third diode connecting said hazard warning switch means to said second relay means, a fourth diode connected between said second relay means and said normally closed contact means of said first relay means, said second relay means including additionally normally open contact means connecting said third left and right rear signal lamps to said hazard warning switch means whereby said left and right front signal lamps and said third left and right rear signal lamps are simultaneously flashed upon actuation of said hazard warning switch means.

5. The system defined in claim 3 further comprising resistance means connected across said first and second diodes, means connecting a portion of said resistance means to said first relay means whereby said first relay means is instantaneously energized upon actuation of said stop signal switch means.

6. The system defined in claim 5 further comprising left and right front signal lamps, hazard warning switch means including periodic interrupter means connected to said source, means connecting said hazard warning switch means to said left and right front signal lamps and to said second input terminal of said direction signal switch means whereby all said front and rear signal lamps are simultaneously flashed upon actuation of said hazard warning switch means.

7. A vehicle signaling system comprising a source of voltage, flasher means connected in series with said source for periodically interrupting said source, left and right front signal lamps, first, second and third left and right rear signal lamps, manually operable direction signal switch means selectively movable from a neutral position to left or right direction signaling positions to selectively connect said flasher means to said left or right front signal lamps and the first of said left or right rear signal lamps respectively, normally open stop signal switch means, said direction signal switch means connecting said first left and right rear signal lamps to said source through said stop signal switch means when in said neutral position, first and second time delay relay means each including a pair of parallel connected windings and a capacitor connected in series with one of the windings, said first time delay relay means being connected to said direction signal switch means and energizable through said flasher means and one of said front signal lamps in either of said operating positions, normally open contact means actuable by said first time delay relay means for connecting said second time delay relay means across said source, additional normally open contact means actuable by said first time delay relay means for connecting the second of said left and right rear signal lamps in parallel with the first of said left and right rear signal lamps respectively, said second time delay relay means including normally open contact means for connecting said second and third left rear signal lamps in parallel with said first left rear signal lamp and connecting said second and third right rear signal lamps in parallel with said first right rear signal lamp, circuit means connecting said stop signal switch means to the other of said windings of said second time delay relay means, whereby said left or right rear lamps are selectively and sequentially energizable upon actuation of said direction signal switch means when said stop signal switch means is open, all of said rear lamps are simultaneously and continuously energized upon actuation of said stop signal switch means with said direction signal switch means in said neutral position and all of the rear lamps on one side of the vehicle flash simultaneously while all of the rear lamps on the opposite side of the vehicle are continuously energized upon concurrent actuation of said direction signal switch means and said stop signal switch means.

8. The system defined in claim 7 wherein the first said normally open contact means actuable by said first time delay relay means comprises first and second normally open contacts, said first normally open contacts being connected in series with said capacitor and said one winding of said second time delay relay means, said second normally open contacts being connected in series with said other winding of said second time delay relay means and in parallel with said first normally open contacts.

9. The system defined in claim 8 wherein said circuit means comprises a current limiting resistor connected to a junction between said second normally open contacts and said other winding.

10. The system defined in claim 7 wherein the first said normally open contact means actuable by said first time delay relay means includes first and second normally open contacts, said first normally open contacts being connected in series with said capacitor and one winding of said second time delay relay means, said second normally open contacts being connected in series between said first normally open contacts and the other winding of said second time delay relay means.

11. The system defined in claim 10 wherein said circuit means comprises a diode connected between stop signal switch means and a junction between said second normally open contacts and said other winding.

12. The system defined in claim 7 further comprising additional flasher means, hazard warning switch means connected to said source through said additional flasher means and including movable contact means adapted when actuated to connect said additional flasher means to both of said front signal lamps, said direction signal switch means connecting said first left and right rear signal lamps to said additional flasher means through said hazard warning switch means when said direction signal switch means is in said neutral position, said hazard warning switch means being further connected to the other of said windings of said second time delay relay means through said circuit means whereby all of said front and rear lamps are simultaneously flashed upon actuation of said hazard warning switch means.

13. The system defined in claim 7 wherein said stop signal switch means comprises a double pole single throw switch, one pole of said switch connecting said first left and right rear signal lamp to said source through said direction signal switch means, said other winding of said second time delay relay means being connected to said source through said circuit means and the other pole of said stop signal switch means, said system further comprising a diode connected between said other winding of said second time delay relay means and the first said normally open contact means actuable by said first time delay relay means.

14. The system defined in claim 13 further including hazard warning switch means, additional flasher means connecting said hazard warning switch means to said source, said hazard warning switch means comprising movable contacts actuable to connect said front signal lamps to said additional flasher means and the first of said left and right rear signal lamps to said additional flasher means through said direction signal switch means when said direction signal switch means is in said neutral position whereby actuation of said hazard warning switch means provides simultaneous flashing of said left and right front signal lamps and the first of said left and right rear signal lamps.

15. The system defined in claim 14 further comprising an additional normally open manually operable switch connected in parallel with the second pole of said stop signal switch means and adapted when closed to energize said other winding of said second time delay relay means whereby concurrent operation of said hazard warning switch means and said additional normally open switch provides simultaneous flashing of all of said left and right rear signal lamps.

16. A direction signaling circuit for a motor vehicle provided with a source of electrical power and at least first and second left and right rear lamps, said circuit comprising flasher means connected in series with said source, a brake switch connected in series with said source and in parallel with said flasher means, a direction signaling switch having first and second input and output terminals and actuable from a neutral position connecting said second input terminal to both of said output terminals to an actuated position connecting said first input terminal to one of said output terminals and said second input terminal to the other of said output terminals means connecting said flasher means to said first input terminal, means connecting said brake switch to said second input terminal, first time delay switching means energizable from said flasher means upon actuation of said direction signaling switch for connecting said first left and right lamps to said first and second output terminals respectively, second time delay switching means energizable under the control of said first time delay switching means for connecting both of said left and right lamps to said first and second output terminals respectively, means connecting said brake switch to said second time delay switching means for energizing said second time delay means independently of said first time delay means whereby said lamps are selectively and sequentially energized upon actuation of said direction signaling switch when said brake switch is open and the lamps on one side are simultaneously flashed while the lamps on the other side are continuously energized when said direction signaling switch and said brake switch are concurrently actuated.